(12) United States Patent
Fiebrandt et al.

(10) Patent No.: US 11,541,849 B2
(45) Date of Patent: *Jan. 3, 2023

(54) CLEANING DEVICE, COMPRESSED AIR SYSTEM, CLEANING METHOD

(71) Applicant: ZF CV SYSTEMS EUROPE BV, Brussels (BE)

(72) Inventors: Jan Fiebrandt, Hannover (DE); Helge Westerkamp, Hannover (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 0 days.

This patent is subject to a terminal disclaimer.

(21) Appl. No.: 17/285,938

(22) PCT Filed: Sep. 30, 2019

(86) PCT No.: PCT/EP2019/076401
§ 371 (c)(1),
(2) Date: Apr. 16, 2021

(87) PCT Pub. No.: WO2020/078702
PCT Pub. Date: Apr. 23, 2020

(65) Prior Publication Data
US 2021/0387596 A1    Dec. 16, 2021

(30) Foreign Application Priority Data
Oct. 19, 2018 (DE) .................... 10 2018 126 090.3

(51) Int. Cl.
*B08B 3/02* (2006.01)
*B60S 1/48* (2006.01)
(Continued)

(52) U.S. Cl.
CPC ............... *B60S 1/481* (2013.01); *B08B 3/02* (2013.01); *B08B 5/02* (2013.01); *B60S 1/52* (2013.01);
(Continued)

(58) Field of Classification Search
CPC .... B60S 1/481; B60S 1/52; B60S 1/54; B60S 1/56; B60S 1/48; B08B 3/02; B08B 5/02;
(Continued)

(56) References Cited

U.S. PATENT DOCUMENTS 3,915,385 A    10/1975   Hassinger
9,707,896 B2   7/2017    Boegel et al.
(Continued)

FOREIGN PATENT DOCUMENTS

DE    2558792 A1    9/1976
DE    19835733 A1   2/2000
(Continued)

*Primary Examiner* — Erin F Bergner
(74) *Attorney, Agent, or Firm* — Leydig, Voit & Mayer, Ltd

(57) ABSTRACT

A cleaning device for selectively bombarding a surface with a media sequence, the sequence including at least a first gaseous medium and a second liquid medium, includes a nozzle configured to bombard the surface with the second medium; a cleaning valve with a holding port, a pressure port, a plunger, and a pressure outlet; and a high-pressure accumulator configured to store the first medium. The first medium is loaded with an accumulator pressure. The cleaning device further includes a changeover valve configured to selectively create a connection between a first medium supply line and a holding line connected to the holding port. The pressure outlet is configured to bombard the surface with the first medium in pulse-like fashion.

23 Claims, 9 Drawing Sheets

(51) Int. Cl.
*B08B 5/02* (2006.01)
*B60S 1/52* (2006.01)
(52) U.S. Cl.
CPC ....... *B08B 2203/02* (2013.01); *B08B 2205/00* (2013.01)
(58) Field of Classification Search
CPC . B08B 2203/02; B08B 2205/00; B05B 1/005; B05B 12/06; B05B 1/083; B05B 12/04; B05B 7/0807; B05B 1/1609; B05B 7/08; B05B 1/00
See application file for complete search history.

(56) References Cited

U.S. PATENT DOCUMENTS

| | | |
|---|---|---|
| 10,252,703 B2 | 4/2019 | Yuji et al. |
| 10,888,890 B2 | 1/2021 | Fiebrandt et al. |
| 2001/0054655 A1 | 12/2001 | Berg et al. |
| 2017/0313286 A1 | 11/2017 | Galera et al. |

FOREIGN PATENT DOCUMENTS

| | | |
|---|---|---|
| DE | 10332939 A1 | 2/2005 |
| DE | 102011082536 A1 | 3/2012 |
| DE | 102014110468 A1 | 1/2016 |
| DE | 102015013203 A1 | 3/2016 |
| DE | 102014220573 A1 | 4/2016 |
| DE | 102016107380 A1 | 11/2016 |
| DE | 102016123637 A1 | 6/2018 |
| WO | WO 2017080614 A1 | 5/2017 |
| WO | WO 2019086158 A1 | 5/2019 |

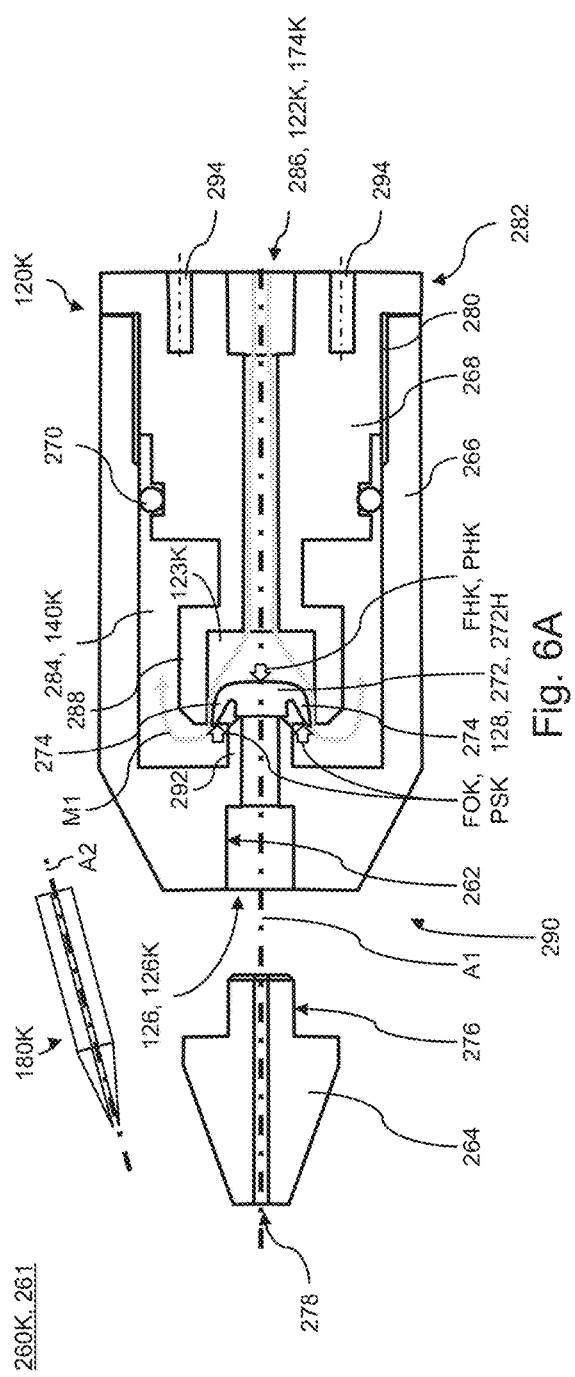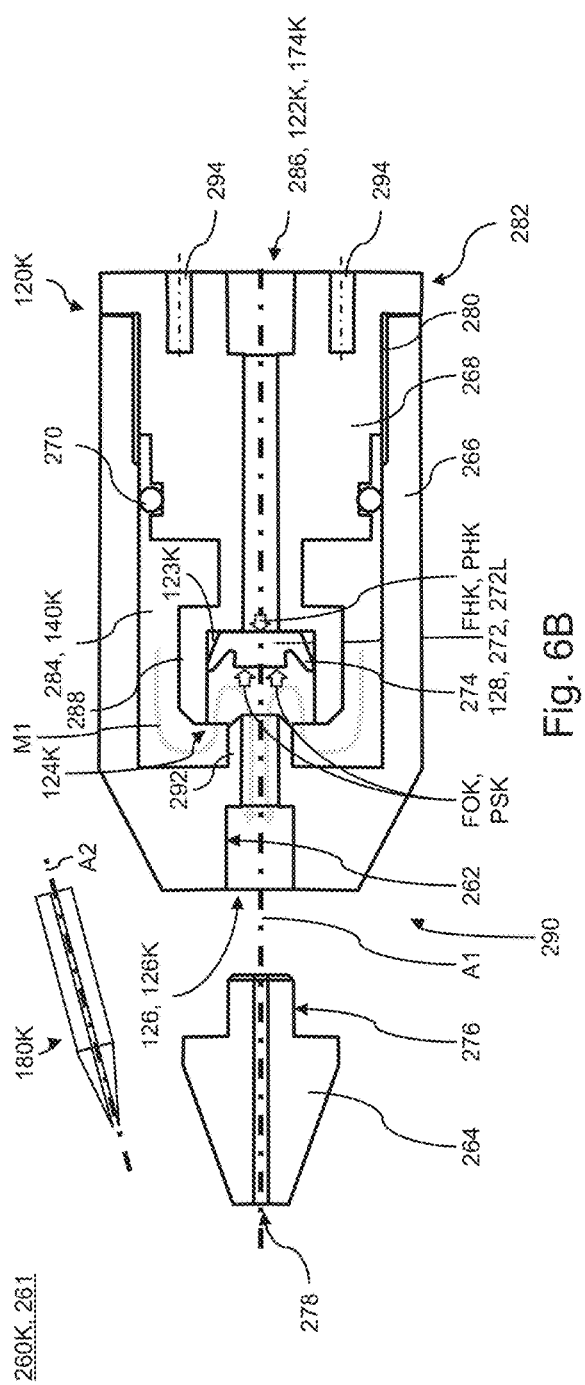

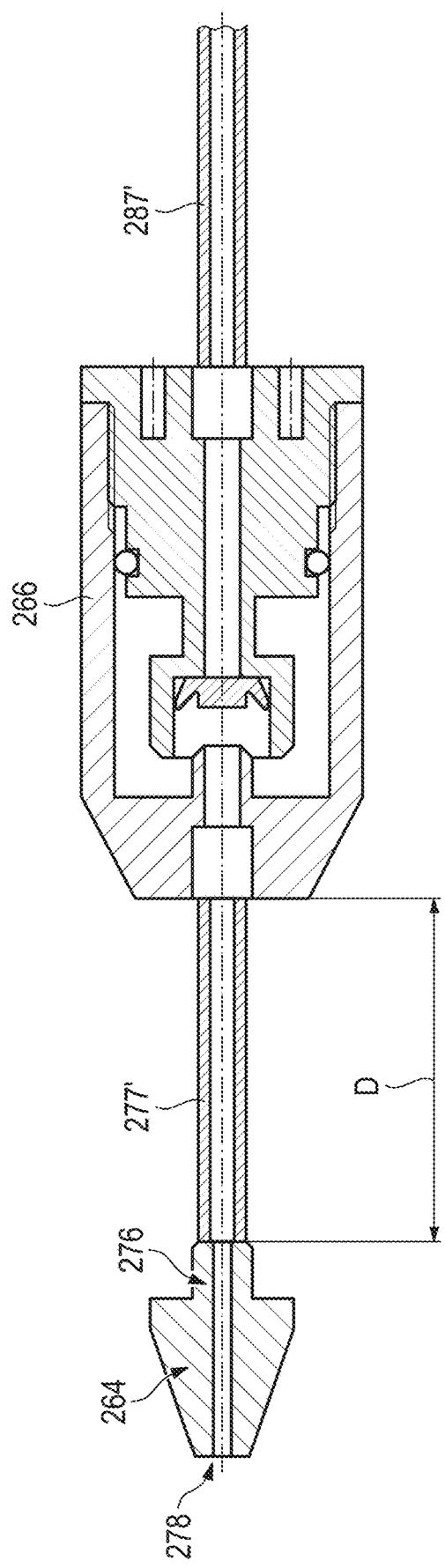

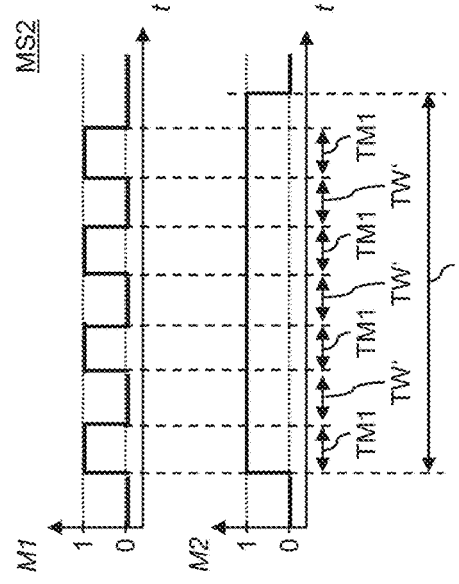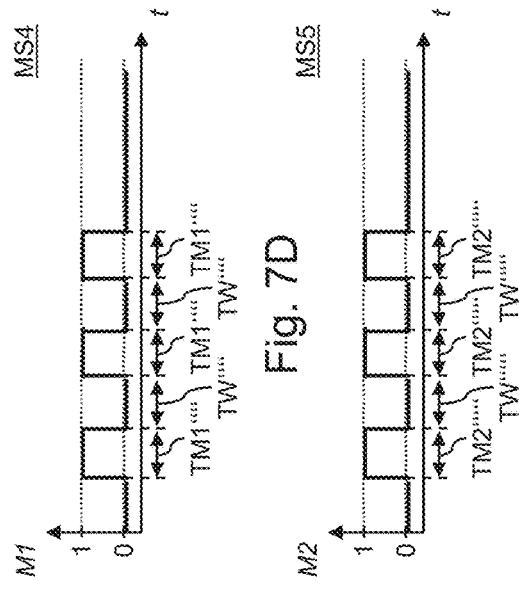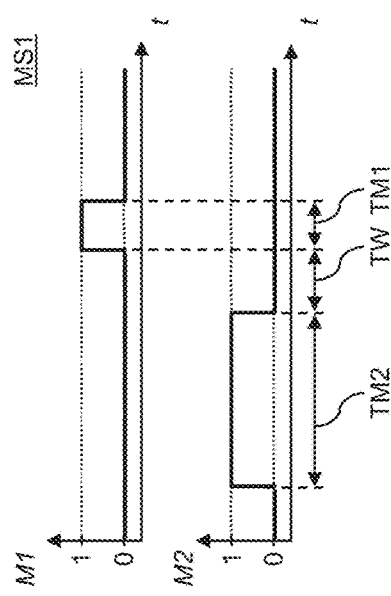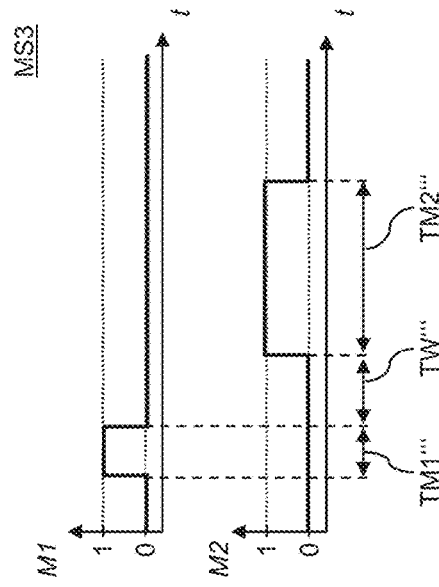

CLEANING DEVICE, COMPRESSED AIR SYSTEM, CLEANING METHOD

CROSS-REFERENCE TO PRIOR APPLICATIONS

This application is a U.S. national phase application under 35 U.S.C. § 371 of International Application No. PCT/EP2019/076401, filed on Sep. 30, 2019, and claims benefit to German Patent Application No. DE 10 2018 126 090.3, filed on Oct. 19, 2018. The international application was published in German on Apr. 23, 2020, as WO 2020/078702 A1 under PCT Article 21(2).

FIELD

The invention concerns a cleaning device for selectively bombarding a surface with a media sequence of at least a first, in particular gaseous medium and a second, in particular liquid medium. The invention also concerns a compressed air system including such a cleaning device, and a corresponding cleaning method.

BACKGROUND

Cleaning devices, in particular for cleaning sensors in vehicles, are generally known.

A cleaning device of the type described initially is disclosed in DE10 2015 013203 A1. This describes a cleaning unit for an image detection unit of a vehicle, which is provided for detecting the environment, with at least one washing water nozzle which is provided to spray washing water onto a transparent cover surface of the image detection unit, with at least one wiper which is intended to mechanically dry the cover surface of the image detection unit, and with at least one compressed air nozzle which is provided to bombard the cover surface of the image detection unit with compressed air.

The concept could however be improved, in particular with respect to the necessity for a mechanical wiper for cleaning.

U.S. Pat. No. 9,707,896 B2 describes a viewing system for a vehicle comprising a camera with an image converter and a lens. The camera is situated on an outer part of the vehicle and has a field of vision outside the vehicle. An airflow element has an inlet opening and an outlet opening, wherein the outlet opening is configured such that it deflects the air flow in front of the lens in order to conduct dirt away from the lens. The outlet opening is configured such that it deflects the air flow with a speed which is greater than an airflow speed flowing into the inlet port. The inlet opening may have an inlet region which is substantially larger than an outlet region of the outlet port. The system may comprise an airflow generating device for generating or amplifying the air flow through the airflow device. This concept thus creates an air curtain for protecting a sensor from external influences, and is also worthy of improvement in particular with respect to cleaning of the sensor.

It is desirable to guarantee reliable and thorough cleaning, in particular with relatively low complexity, in particular with respect to apparatus. Furthermore, a low consumption of energy and cleaning media is desirable, together with a robust structure requiring as little maintenance as possible.

SUMMARY

In an embodiment, the present invention provides a cleaning device for selectively bombarding a surface with a media sequence of at least a first gaseous medium and a second liquid medium. The cleaning device includes a nozzle configured to bombard the surface with the second medium; a cleaning valve with a holding port, a pressure port, a plunger, and a pressure outlet; and a high-pressure accumulator configured to store the first medium. The first medium is loaded with an accumulator pressure. The cleaning device further includes a changeover valve configured to selectively create a connection between a first medium supply line and a holding line connected to the holding port. The pressure outlet is configured to bombard the surface with the first medium in pulse-like fashion.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6A-6C show yet a further preferred refinement of a cleaning device according to the concept of the invention with a valve accumulator module, FIG. 7A-7E show as examples and greatly simplified, five possible media sequences.

DETAILED DESCRIPTION

Figure 1:
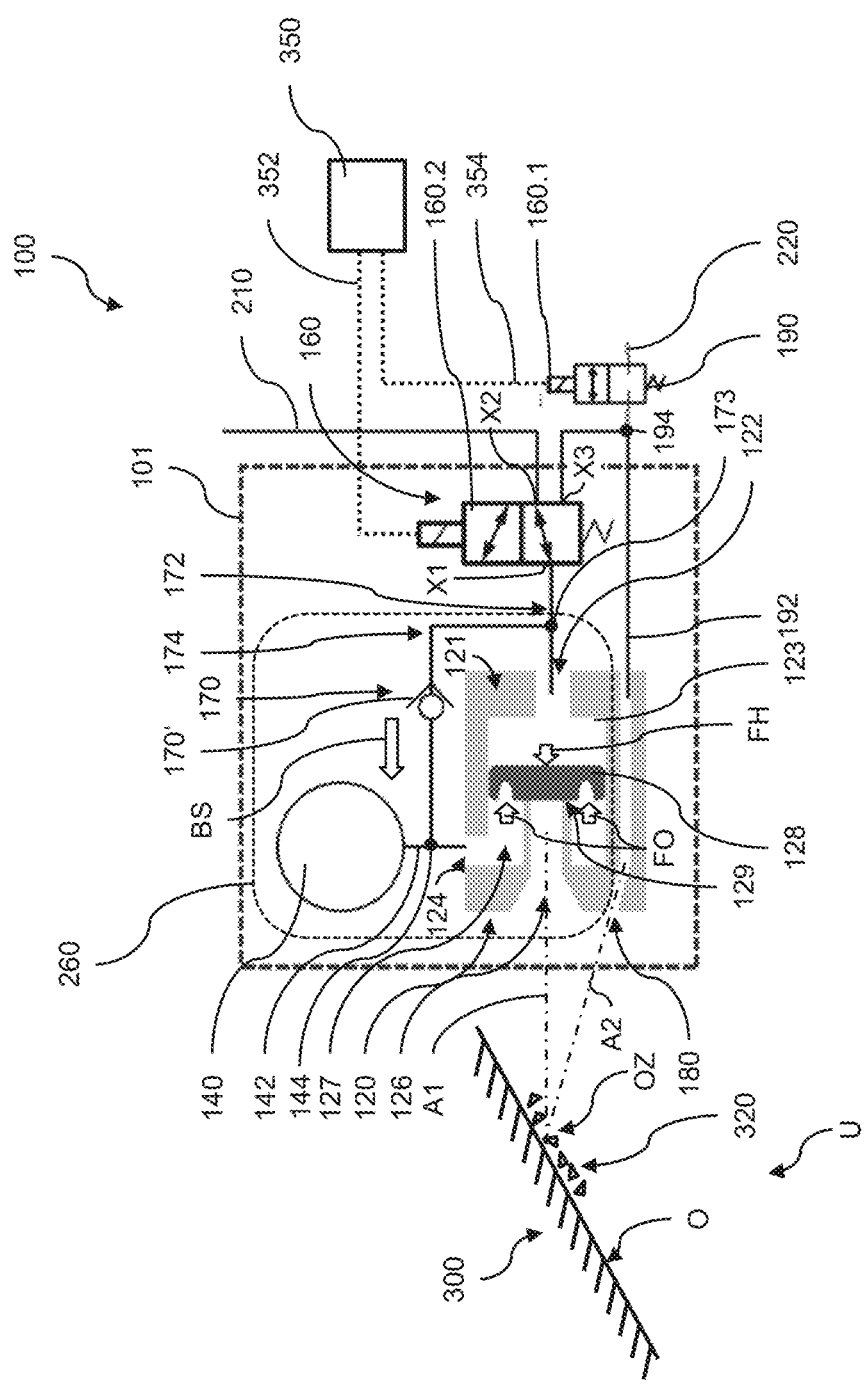
FIG. 1 a diagrammatic view of an embodiment of a cleaning device according to the concept of the invention.

In an embodiment the present invention provides an improved cleaning device which at least partially eliminates problems outlined above.

In particular, a high level of reliability and thoroughness of cleaning are to be achieved, and the equipment level and complexity of maintenance of a cleaning device reduced. Also, a relatively low consumption of energy and cleaning media is to be achieved.

The invention is based on a cleaning device for bombarding a surface with a media sequence of at least a first medium and a second medium, comprising a nozzle configured for bombarding the surface with the second medium, and a cleaning valve with a holding port, a pressure port, a plunger and a pressure outlet.

According to the invention, in the cleaning device, it is provided that the pressure port is configured for pulse-like bombardment of the surface with a first medium, and a high-pressure accumulator is configured for storing the first medium which is in particular loaded with an accumulator pressure, and a changeover valve is provided for selectively creating a connection between a first medium supply line and a holding line connected to the holding port.

In particular, in the cleaning device it is provided that the pressure outlet and the nozzle are configured to bombard the surface with the media sequence in pulse-like fashion.

The invention is based considers that it is generally advantageous to keep the complexity of cleaning of surfaces, in particular the complexity of apparatus and the consumption of energy and cleaning media, as low as possible, without however limiting the cleaning effect. This applies in particular to the cleaning of surfaces of a sensor or sensor cover, for which a clean surface is a requirement for proper and reliable function of the sensor.

The invention acknowledges that bombarding a surface to be cleaned with a media sequence, in particular a sequence of at least two media which are controlled intermittently and/or alternately and each conducted in a jet onto the surface, in particular in the manner of one or more pulses, leads to a relatively high cleaning effect. In particular, the invention has found that a sequence of bombardment with a cleaning agent followed by bombardment with one or more compressed air pulses leads to improved cleaning effect, in particular compared with cleaning methods based exclusively on compressed air or exclusively on liquid. Also, in comparison with continuous bombardment systems, the advantage is achieved that energy and cleaning media can be saved.

The term "pulse-like" the context of the invention means a sudden, brief bombardment of a surface with a medium, the impetus of which is suitable in particular for detaching and/or removing particles, in particular dirt particles, present on the surface. In general, the cleaning effect of the pulse is advantageously increased amongst others by a relatively high mass of the medium, a relatively high impact speed of the medium on the surface, and a relatively rapid triggering of the bombardment. A relatively rapid triggering of the bombardment—in particular in contrast to a slow and continuously increasing medium flow—leads to a limited air mass, which is in particular stored in an accumulator, hitting the surface within a relatively short period. Thus advantageously, a high impetus is achieved.

The invention has furthermore noted that bombardment with such a media sequence achieves a cleaning effect which may be at least sufficient, or even better compared with other cleaning methods based exclusively on compressed air or exclusively on liquid, so that in particular the dependency on a mechanical cleaning device, such as e.g. a wiper or similar device in contact with the surface to be cleaned, can be reduced, or such a mechanical cleaning device may even be completely omitted. Thus advantageously, the number of moving parts subject to wear is reduced and hence the robustness increased, and the production costs and susceptibility to fault of the cleaning device are reduced. In the context of the invention, a media sequence is a sequence of one or more bombardments in the context of a cleaning process. Particularly preferably, a media sequence comprises one or more in particular pulse-like bombardments with a first medium, in particular compressed air, and one or more bombardments with a second medium, in particular water.

The invention also concerns a compressed air system comprising at least one sensor, wherein the sensor or an in particular transparent cover of the sensor has a surface, at least one cleaning device according to the concept of the invention, wherein a first medium source of the compressed air system can be connected to the at least one cleaning device via a first medium supply line, and a second medium source can be connected to the at least one cleaning device via a second medium supply line.

The invention also concerns a cleaning method for cleaning a surface, comprising the steps: charging a high-pressure accumulator with a first medium, in particular air; holding an accumulator pressure in the high-pressure accumulator, in particular by holding a holding pressure at the holding port of the cleaning valve, in particular by switching the changeover valve into a holding position; bombarding the surface with a second medium, in particular water or a cleaning agent; bombarding the surface with the first medium, in particular by releasing the holding pressure at the holding port, in particular by switching the changeover valve into a release position.

In a refinement of the cleaning method, it is provided that the bombardment of the surface with the second medium and the bombardment of the surface with the first medium take place under temporal control, in particular alternately and/or intermittently. In concrete terms, this may in particular include that individual bombardments or media sequences may be repeated or combined with each other arbitrarily, in particular as required. For example, alternating bombardments of a first medium and a second medium, in particular alternating bombardment with compressed air and cleaning fluid, may be advantageous for achieving a desired or necessary cleaning effect. It is also furthermore possible to establish the number of repeats of an individual bombardment or media sequence, for example three or five repeats. It is also possible to use, in one bombardment or media sequence, exclusively one medium, for example exclusively compressed air or exclusively water or cleaning fluid.

In a refinement, it is also advantageously possible to repeat an individual bombardment or media sequence depending on the achieved cleaning effect and/or the particles remaining on the surface. Thus for example a measurement value of the sensor assigned to the surface may serve as an interruption criterion for the repeats. Here for example a brightness value of an optical sensor may be used, which increases as more particles are removed from the surface, or a reference image which has increasing correlation with the camera image recorded by the optical sensor as more particles are removed from the surface.

The advantages of the device are advantageously utilized in the compressed air system according to the invention. In particular, the lower equipment complexity and reduced dependency on mechanically moved parts, e.g. wipers, are advantageous for applications in vehicles and similar, in particular mobile, machines. Also, with the use of a compressed air system according to the invention in a vehicle, the lower consumption of energy and cleaning media is advantageous since energy and cleaning media are present only to limited extents in vehicles and comparable mobile systems. Also, the aspect of reliable cleaning is important in a vehicle, since sensors to be cleaned often perform critical and safety-relevant functions.

The advantages of the device are also advantageously utilized in a cleaning method according to the invention, in the same way as in the cleaning device and the compressed air system.

In particular, it is provided that the cleaning device is configured, in particular by means of a control module, to bombard the surface with the first medium and/or the second medium selectively, in particular individually, simultaneously or alternately. This may include in particular that the changeover valve or valves can be actuated so as to produce a media sequence in controllable fashion, in particular by a temporally coordinated actuation of the changeover valve or valves. Depending on the pre-setting and/or requirement, here individual bombardments or media sequences may be repeated, and/or different bombardments or media sequences combined. In particular, it is also possible to arrange bombardments or media sequences with exclusively one medium, e.g. only with compressed air or only with water or cleaning fluid. The control module may be configured as part of the cleaning device or be implemented in another form, for example as part of a higher-level control system, in particular as part of a controller bus or similar electronic control system.

In particular, it is provided that the cleaning device is configured to control the composition and order of the media sequence temporally, in particular alternately and/or intermittently. In concrete terms, this may be achieved in particular by actuating the first and second changeover valves. A temporally controlled bombardment may advantageously achieve optimal cleaning of the surface depending on the degree of soiling, environmental conditions and operating parameters. The term "alternately" here in particular means that at a point in time, always only one medium is being applied onto the surface. In concrete terms, this means in particular that bombardment with the one e.g. first medium is completely interrupted, and then bombardment with the other e.g. second medium begins, and conversely only after interruption of the bombardment with the second medium does the system continue with bombardment with the first medium. Between bombardments, in particular during a media sequence, defined pauses may be provided e.g. for softening dirt particles.

The term "intermittent" means in particular that the respective media flows, in particular the flows of the first medium and second medium, are respectively triggered and interrupted. Two media may be applied onto the surface simultaneously. For example, during a media sequence, the surface may be continuously bombarded with water, i.e. the second medium, while one or more compressed air pulses, i.e. bombardment with the first medium, are triggered.

Advantageously, it is provided that the cleaning valve is configured as a fast purge valve. Use of a fast purge valve may in particular achieve, in a relatively simple structural fashion, a pulse-like bombardment of the surface with the first medium, in particular compressed air. The pulse-like bombardment advantageously achieves a relatively high cleaning power. Also, in the sense of precontrol, a fast purge valve can advantageously switch a relatively large mass flow, in particular an air mass flow, with a relatively low holding pressure. In synergetic cooperation of the fast purge valve with the high-pressure accumulator, a high-pressure accumulator can be filled with a relatively small air mass flow over a longer period, and then be evacuated in a relatively short period in that a large air mass flow is conducted through the pressure outlet of the fast purge valve. A short and in particular sudden but large air mass flow creates a high impetus which occurs when hitting the surface, achieving a high cleaning power.

In particular, it is provided that the cleaning valve has a movable plunger, in particular for triggering a pulse-like flow of the first medium, wherein the plunger can be controlled via a holding pressure present at the holding port. Here too, similarly to the refinement described above, in the sense of precontrol a fast purge valve can advantageously switch a relatively large mass flow, in particular an air mass flow, with a relatively low holding pressure. Because the area loaded with the holding pressure is greater on the side of the holding chamber than on the side of the inlet chamber, the plunger can be closed with a relatively low holding pressure, but nonetheless on opening of the plunger, a relatively large mass flow can be conducted in pulse-like fashion onto the surface via the pressure outlet.

In the context of a preferred refinement, it is provided that the plunger is configured so as to be one-way permeable, in particular to allow a flow of the first medium from the holding port to the pressure port and to block this in the opposite direction. In concrete terms, this means in particular that the plunger can advantageously act as a check valve, and allow a flow of the first medium in particular in the case that a higher pressure prevails at the holding port than at the pressure port. For this, the plunger may have an annular recess on the side facing an inlet chamber, and/or a sealing lip running substantially on the outer periphery of the plunger. Such features advantageously achieve an elasticity of the plunger which allows a flow of a medium in one direction and blocks it in the opposite direction.

The term "one-way permeable" in this context need not mean that the plunger itself is permeable, but for example because of its deformability it allows a flow past itself (i.e. past the plunger) in one direction and blocks it in the opposite direction. Such a permeability thus results not from a permeable material but from the deformability and a resulting gap between the plunger and a component adjoining the plunger, for example an inner wall of the cleaning valve and/or in particular the inner wall of the holding chamber.

In such a refinement with a one-way permeable plunger, the plunger can advantageously perform both the function of the accumulator line and that of the high-pressure accumulator holding valve acting as a check valve. In particular, because these components may be omitted, the cleaning device advantageously becomes more compact. Also, in such a refinement, advantageously compressed air losses can be reduced.

In the context of a preferred refinement, it is provided that the high-pressure accumulator is connected to the holding line, in particular via an accumulator branch point and an accumulator line. In concrete terms, this means in particular that the high-pressure accumulator can be filled via the holding line. Thus the dependency on further lines can be reduced and the complexity of the cleaning device advantageously reduced. This refinement advantageously utilizes the fact that the holding line must in any case be held under a holding pressure in order to close the cleaning valve, and this available pressure is used to fill the high-pressure accumulator.

In the context of a preferred refinement, it is provided that a high-pressure accumulator holding valve is arranged in the accumulator line, wherein the high-pressure accumulator holding valve is in particular configured as a check valve which blocks against a filling direction of the high-pressure accumulator. Such a high-pressure accumulator holding valve advantageously achieves that, on switching of the first changeover valve to a release position, the first medium stored in the high-pressure accumulator does not escape via the accumulator line but flows into the pressure port of the cleaning valve.

Advantageously, it is provided that the pressure outlet is configured to conduct the first medium onto the surface practically along a first jet axis. In concrete terms, this means in particular that the first medium is conducted in reproducible fashion onto a point or region of the surface to be cleaned. For this, the pressure outlet, in the sense of a nozzle, is in particular configured and oriented symmetrically about the first jet axis.

In particular, it is provided that the nozzle is configured to conduct the second medium onto the surface practically along a second jet axis. In concrete terms, in particular this means that the second medium is conducted in reproducible fashion onto a point or region of the surface to be cleaned. For this, the nozzle is configured and oriented in particular symmetrically about the second jet axis.

As part of a preferred refinement, it is provided that the first jet axis and the second jet axis intersect in a target region on the surface. In particular, this means in concrete terms that the first medium and the second medium hit the surface at a shared location or region, and thus can cooperate to achieve the advantageous cleaning effect according to the concept of the invention. However, it is also possible to orient the two jet axes such that they intersect the surface at a defined spacing. Thus any environmental conditions, in particular the travel wind acting on the vehicle and hence on the sensor, and/or the inertia of the individual media, may be taken into account in order nonetheless to guarantee an approximately local meeting of the two media on the surface within a target region.

In particular, it is provided that the high-pressure accumulator has a capacity of 0 cl to 20 cl, preferably 1 cl to 10 cl, particularly preferably 3 cl to 7 cl. The capacity of the high-pressure accumulator—together with the pressure of the first medium stored in the high-pressure accumulator, in particular the holding pressure—establishes the duration and intensity of the cleaning pulse of the first medium.

In the context of a preferred refinement, it is provided that the cleaning device is arranged as a structural unit in the form of a cleaning module, in particular the high-pressure accumulator is arranged in or directly on the cleaning valve. This can achieve a compact and robust construction of the cleaning device, and this can therefore be positioned, in particular advantageously, as close as possible to the surface to be cleaned. Such a structure also advantageously achieves that the medium to be stored need travel shorter distances and hence pressure losses are reduced, and the impetus generated by the applied medium is increased. In particular, such a refinement achieves that the ratio of useful volume to loss volume is advantageously increased. The useful volume here means the storage volume of the high-pressure accumulator, and the loss volume is the volume of the lines between the high-pressure accumulator and the cleaning valve. Also, a modular nature of the cleaning module simplifies replacement of the cleaning module and hence repair.

In particular, it is provided that the nozzle is supplied via a supply line, wherein the supply line is connected to a second medium supply line via a second changeover valve. In concrete terms, this means that the bombardment of the surface with the second medium can be controlled in that the supply of the second medium to the nozzle can be influenced by means of the second changeover valve. In particular, the second changeover valve may be configured as a magnetic valve.

In particular, a valve accumulator arrangement which is designed as a valve accumulator module is provided, which valve accumulator arrangement comprises at least the cleaning valve and the high-pressure accumulator. The high-pressure accumulator is advantageously integrated into the valve accumulator module. In such a refinement, the valve accumulator module may be constructed in two parts, in particular from a module inner part and a module outer part.

It is advantageously furthermore possible for a module nozzle tip to be inserted, in particular exchangeably, into an exchange port at the pressure outlet of the module outer part.

Such a refinement with a valve accumulator module has multiple advantages. Firstly, the high-pressure accumulator integrated into the valve accumulator module allows a compact design of the cleaning device, which is advantageous in particular in vehicles for the purposes of saving weight and structural space. In particular, in this way, it is possible to advantageously realize a multiplicity of sensors with a corresponding number of cleaning devices.

The high-pressure accumulator is advantageously integrated into the valve accumulator module and thus arranged spatially close to the pressure outlet. In this way, it is achieved as a second advantage that the first medium, in particular the compressed air, only has to cover a relatively short distance to the pressure outlet upon the release of the module plunger. A fast reaction time is thus advantageously achieved. A fast reaction time is in particular associated with only a short delay between the release of the holding pressure at the module port and the pulse-like bombardment of the surface to be cleaned.

Thirdly, the high-pressure accumulator always allows the provision of a constant flow rate of the first medium, in particular of the compressed air. Owing to the integrated high-pressure accumulator, this is realized without complex measurement and control technology. This ensures the constant volume of the high-pressure accumulator and the functioning of the emptying of the high-pressure accumulator simply by means of the movement of the module plunger in the manner of a fast purge valve. In this way, it is always the case that a defined volume is provided via the pressure outlet.

Fourthly, despite the integration of the high-pressure accumulator into the valve accumulator module, it is also the case in this refinement that a pneumatic or hydraulic decoupling of the cleaning device from an—in particular central—medium source, for example from a compressed-air supply and/or a compressor of a vehicle, is achieved. Thus, after charging of the high-pressure accumulator, the accumulator pressure required for a cleaning pulse is available independently of the availability of the central medium source.

In particular, it is provided that the pressure outlet has an exchange port for exchangeably receiving a module nozzle tip. The releasable connection by way of an exchange port advantageously allows an exchange of the module nozzle tip. In particular, it is possible in this way for different module nozzle tips to be used. For example, by means of the targeted adaptation of the diameter of a tip passage, the speed of the medium emerging outward through the pressure outlet can be changed. Correspondingly, it is for example possible, with a relatively small diameter of the tip passage, for example a diameter of 2 mm, to achieve a higher output speed than in the case of a diameter of for example 4 mm. In this way, it is possible in particular for the cleaning pulse to be increased. Also, through the possibility of removing the module nozzle tip, improved access to the pressure outlet, in particular for the purposes of maintenance or cleaning of the accumulator valve module, is achieved.

In a refinement of the compressed air system, it is provided that the first medium source serves another primary purpose, in particular the supply of an air suspension system or similar pneumatic system. In such a refinement, advantageously an existing medium source, in particular a compressed air source, may be used to supply the cleaning device. This is advantageous in particular on use in a vehicle or similar mobile system, since the number of required components is reduced and hence weight, costs and energy can be saved.

In a refinement of the compressed air system, it is provided that the second medium source serves another primary purpose, in particular the supply of a screen cleaning system or similar cleaning system. In such a refinement, advantageously an existing medium source, in particular a source of liquid and/or cleaning agent, may be used to supply the cleaning device. This is advantageous in particular on use in a vehicle or similar mobile system, since the number of required components is reduced and hence weight, costs and energy can be saved.

In a refinement of the compressed air system, it is provided that the sensor is an optical sensor, in particular an environment detection sensor. In such a refinement, a cleaning device according to the concept of the invention is particularly advantageous, since regular cleaning of the sensor surface improves the function of the sensor, in particular because the optical properties of the sensor depend on the transparency and/or translucency of the sensor surface.

In a refinement of the compressed air system, it is provided that the first medium source has a compressor arrangement and/or a compressed air accumulator, in particular the compressor arrangement is arranged in the compressed air accumulator. This particularly advantageously achieves a compact structure of the compressed air system.

In a refinement of the compressed air system, it is provided that the compressed air system comprises at least one supply line check valve, in particular in the first medium supply line and/or a first source line. Such a refinement particularly advantageously achieves that the compressed air generated by a compressor arrangement cannot escape via leakage points—in the case of leaks or similar loss of tightness leading to a pressure loss—which may be present upstream of the valve in the conveying direction. This is the case in particular since at least one supply line check valve blocks in this flow direction opposite the conveying direction, and hence in particular the holding pressure can be maintained in the part of the compressed air system downstream of the valve in the conveying direction.

Embodiments of the invention are now described below with reference to the drawing. This does not necessarily depict the embodiments to scale, but rather the drawing, where useful for comprehension, is produced in diagrammatic and/or slightly distorted form. With respect to supplements to the teaching directly evident from the drawing, reference is made to the relevant prior art. It must be taken into account that many modifications and changes can be made concerning the form and detail of an embodiment without deviating from the general concept of the invention. The features of the invention disclosed in the description, the drawing and the claims may be essential to the development of the invention, both individually and in any combination. Also, the scope of the invention includes all combinations of at least two of the features disclosed in the description, the drawing and/or the claims. The general concept of the invention is not restricted to the precise form or detail of the preferred embodiments shown and described below, or restricted to a subject which would be limited in comparison with the subjects claimed in the claims. Where dimensional ranges are given, values lying inside said limits are also disclosed as limit values, and may be used and claimed arbitrarily. For the sake of simplicity, the same reference signs are used below for identical or similar parts, or parts with identical or similar function.

Further advantages, features and details of the invention arise from the following description of preferred embodiments and the drawing.

FIG. 1 shows a diagrammatic view of an embodiment of a cleaning device 100 according to the concept of the invention, which in the present case is formed as a structural unit in the form of a cleaning module 101. A cleaning valve 120, in the present case configured as a fast purge valve 121, is arranged in the cleaning module 101. The cleaning valve 120 has a holding port 122 which is connected via a holding line 172 to a first changeover valve port X1 of a changeover valve 160. In the present case, the fast purge valve 121 and the high-pressure accumulator 140 together with a high-pressure accumulator holding valve 170 in particular form an accumulator valve arrangement 260. The cleaning valve 120 furthermore comprises a pressure port 124 which is connected via an accumulator port 142 to a high-pressure accumulator 140, and leads to an inlet chamber 127 of the cleaning valve 120.

Furthermore, the cleaning valve 120 has a pressure outlet 126 which is configured so as to conduct an emerging fluid, in particular a first medium M1, along a first jet axis A1 onto a target region OZ of a surface O. The surface O may in particular be the surface O of a sensor 300, or (not shown here) the surface O of a cover 310 of a sensor 300. In particular, the sensor 300 may be an optical sensor 302 (not shown here), and in particular an environment detection sensor 304 (also not shown here).

The cleaning valve 120 has a further outlet in the form of a nozzle 180. The nozzle 180 is configured so as to conduct a fluid, in particular a second medium M2, along a second jet axis A2 onto the target region OZ of the surface O. Thus the pressure outlet 126 and the nozzle 180 are configured such that their jet axes A1, A2 intersect practically at a point, namely in the target region OZ on the surface O.

In the present case, the cleaning valve 120 and the nozzle 180 are configured as a structural unit. However, it is evidently possible for the cleaning valve 120 and the nozzle 180 to each form independent structural units which are assembled in particular in a defined spatial relationship relative to one another. The nozzle 180 is connected by means of a supply line 192. The supply line 192 can also be separably connected via a second changeover valve 190 to a second medium line 220 for supply of the second medium M2. Evidently, it is also conceivable that the first jet axis A1 and the second jet axis A2 do not intersect, but merely hit the surface O at different positions, for example in order to take account of different inertial properties of the first medium M1 and the second medium M2, in particular if the region between the cleaning device 100 and the surface 300 is exposed to acceleration, travel wind and/or similar environmental influences.

In the present case, the changeover valve 160—configured as a magnetic valve—is in a first holding position 160.1. In this holding position 160.1, there is a connection between the first changeover valve port X1 and a second changeover valve port X2. The second changeover valve port X2 is connected to a first medium supply line 210, via which the first medium M1 is supplied to the cleaning device 100.

In the present case, an accumulator branch point 173 is arranged in the holding line 172 and forms the starting point for an accumulator line 174 which connects the accumulator branch point 173 to a charging branch point 144. Via the accumulator line 174, the first medium M1 can flow in a filling direction BS from the holding line 172 in the direction of the charging branch point 144, and on via an accumulator port 142 into the high-pressure accumulator 140, where the first medium M1 is stored with a storage pressure PS which in particular corresponds substantially to the holding pressure PH. The storage pressure PS results in particular from the pressure with which the first medium M1 is supplied to the holding line 172, in particular the holding pressure PH, in some cases minus pressure losses occurring along the accumulator line 174. The first medium M1 flowing from the accumulator branch point 173 in the direction of the holding port 122 here causes a holding pressure PH to prevail in the holding chamber 123 of the cleaning valve 120. This holding pressure PH causes a plunger 128 to be pressed by a holding force FH against an outlet stop 129, thus closing the pressure outlet 126.

Thus because the plunger 128 is pressed by the holding force FH against the outlet stop 192, the first medium M1 cannot flow further from the charging branch point 144 in the direction of the pressure port 124, but only into the high-pressure accumulator 140. This is the case because the flow path after the inlet chamber 127 is blocked by the plunger 128. The first medium M1 conducted into the inlet chamber 127 of the cleaning valve 120 via the pressure port 124 in fact exerts an opening force FO opposite the holding force FH. This opening force FO however is smaller than the holding force FH because of the smaller loaded area of the plunger 128 and also because of the pressure losses, in particular through the accumulator line 174.

Furthermore, the high-pressure accumulator holding valve 170 is arranged in the accumulator line 174, and in the present case is configured as a check valve 170' which opens automatically in the filling direction BS against a spring force. The high-pressure accumulator holding valve 170 is configured to allow the flow of the first medium M1 in the filling direction BS and to block the flow in the opposite direction. This enables the high-pressure accumulator 140 to be filled, in particular when the holding line 172 is loaded with the holding pressure PH, while the first medium M1 stored in the high-pressure accumulator 140 cannot escape via the accumulator line 174 when the changeover valve 160 is switched into a release position 160.2.

If the changeover valve 160 is switched from the holding position 160.1 into the release position 160.2, the second changeover valve port X2 is blocked and a connection is created between the first changeover valve port X1 and a third changeover valve port X3. The third changeover valve port X3 is connected to the supply line 192 leading to the nozzle 180 via a purge branch point 194.

In the release position 160.2, the first medium M1 held in the holding chamber 123 can escape back via the holding line 172, the purge branch point 194, the supply line 192 and finally the nozzle 180. Consequently, the holding force FH acting on the plunger 128 diminishes and falls below the amount of the opposingly acting opening force FO. Thus the plunger 128 is no longer pressed against the outlet stop 129 but moves into the holding chamber 123, so that the first medium M1—which is stored under pressure in the high-pressure accumulator 140—can flow via the accumulator port 144 and the pressure port 124 and the inlet chamber 127 to the pressure outlet 126, and from there be conducted along the first jet axis A1 onto the target region OZ of the surface O. The return movement of the plunger 128 described takes place relatively quickly, in particular suddenly and in a relatively large mass flow, so that the first medium M1 hits the surface O with a relatively high impetus.

It is particularly preferred that the first medium M1 is air. Air can be drawn in from the atmosphere, compressed into compressed air in a compressor 402 (not shown here) and stored in the high-pressure accumulator 140. When the surface O is bombarded, in particular in pulse-like fashion, with compressed air by means of the cleaning valve 120, an advantageous cleaning effect is achieved, in particular together with an additional bombardment of the surface O, alternately or at the same time and intermittently, with a second medium M2 by the nozzle 180 of the cleaning valve 120. The bombardment with the second medium M2 can be controlled via the second changeover valve 190.

By means of a control module 350 (shown here as an example) which is connected for signal conduction both to the changeover valve 160 via a first changeover valve control line 352 and also to the second changeover valve 190 via a second changeover valve control line 354, both the changeover valve 160 and the second changeover valve 190 may be opened or closed, in particular in order to bombard the surface O in controllable fashion and/or to generate media sequences.

It is particularly preferred that the second medium M2 is formed by water M2.1 or a cleaning agent M2.2, or a mixture of water M2.1 and cleaning agent M2.2. Also, the second medium M2 can advantageously be taken from a medium source already present in a system, in particular a vehicle. Such a medium source may for example be a tank with cleaning fluid for a screen cleaning system.

The alternating bombardment of the surface O with the first medium M2 and the second medium M2, or a simultaneous, mutually independent and intermittent bombardment of the surface O with the first medium M1 and the second medium M2, can advantageously achieve an improved cleaning effect. The improved cleaning effect occurs in particular since bombardment with a first, in particular liquid second medium M2 leads to a softening of dirt particles 320 and the same undesirable particles on the surface O, and a subsequent, in particular pulse-like bombardment with an in particular gaseous first medium M1 leads to a reliable removal of the softened dirt particles 320.

Figure 2A:
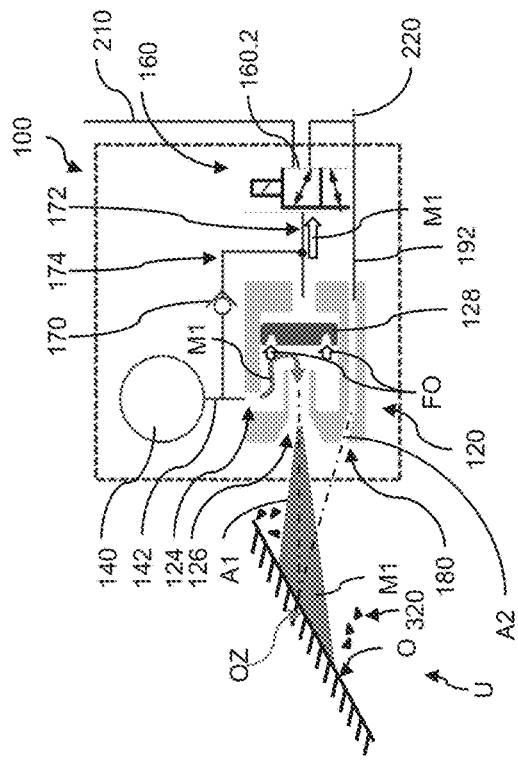
FIG. 2A-D show a sequence of a cleaning process according to the concept of the invention.

FIGS. 2A to 2D show substantially the refinement from FIG. 1 in a sequence of a cleaning process according to the concept of the invention. In FIG. 2A, the surface O is bombarded with the second medium M2 through the nozzle 180. For this, the second medium M2 flows via the second medium supply line 220 and the supply line 192 to the nozzle 180. Any dirt particles 320 present on the surface O are bombarded with the liquid second medium M2 and softened. It is also possible that at least some of the dirt particles 320 have already been removed by the bombardment with the second medium M2.

At the same time, the changeover valve 160 is in the holding position 160.1. The holding position 160.1 creates a connection between the first medium supply line 210 and the holding line 172, through which the first medium M1 loaded with the holding pressure PH reaches the holding port 122 of the cleaning valve 120. The plunger 128 is thereby pressed by the holding force FH against the holding stop 129 and the pressure port 124 is thus blocked.

Figure 2B:
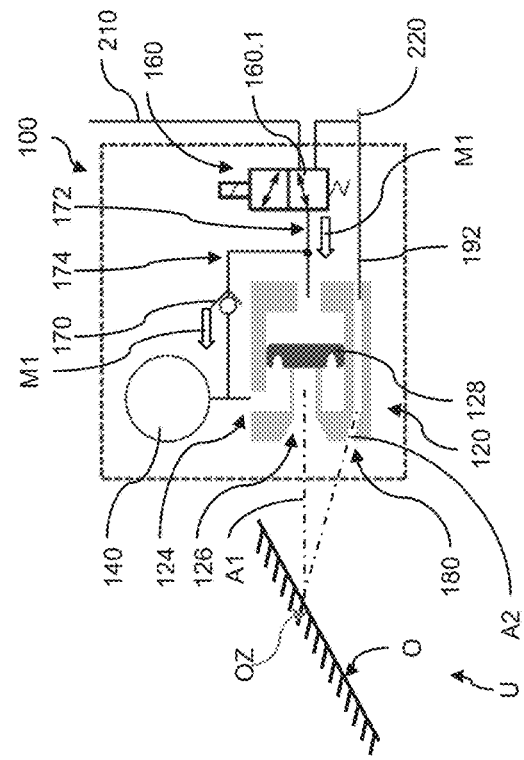

In FIG. 2B, the bombardment of the surface O with the second medium M2 is interrupted and the changeover valve 160 is in the release position 160.2. In this way, the first medium M1 escapes from the holding line 172 and passes via the purge branch point 194 and the nozzle 180 into the environment U. The amount of the holding force FH thus falls below the amount of the opposite acting opening force FO. Consequently, the plunger 128 is moved by the opening force FO back from the holding stop 129 into the holding chamber 123. The first medium M1 may thus flow from the high-pressure accumulator 140 via the accumulator port 142 to the pressure port 124, and through the cleaning valve 120 to the pressure outlet 126. The relatively rapid opening of the cleaning valve 120—configured as a fast purging valve 121—leads to a pulse-like bombardment of the surface O with the first medium M1. The pulse-like bombardment in particular removes the dirt particles 320 which have at least been partially softened in the previous step. The effect of the pulse-like bombardment is comparable to the effect of a mechanical cleaning device, for example a screen wiper. According to the concept of the invention, to achieve such a cleaning effect however no such mechanically moved parts, such as e.g. a wiper, which are subject to wear and in contact with the surface O, are required.

Figure 2C:
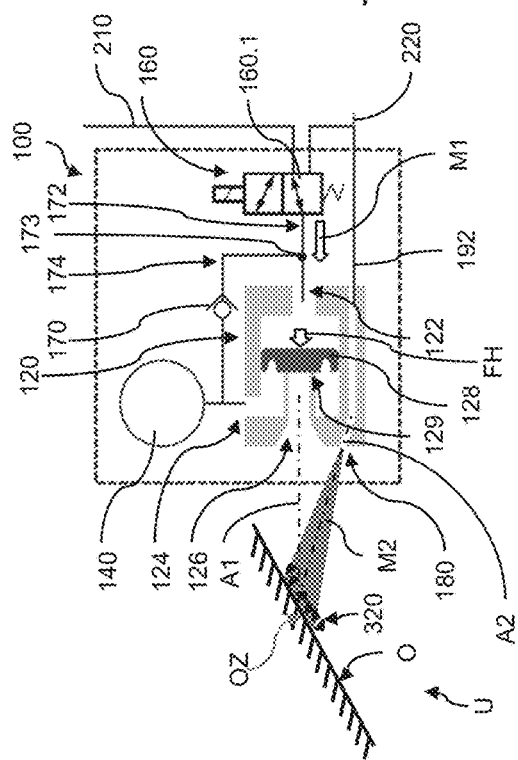

FIG. 2C shows the cleaning device 100 in a state in which the bombardment of the surface O with the first medium M1 has ended. In particular, the high-pressure accumulator 140 is empty and the changeover valve 160 is again in the holding position 160.1. The holding position 160.1 allows the first medium M1 to flow again via the first medium supply line 210 into the holding line 172, so that a holding pressure PH is present at the holding port 122. The holding pressure PH at the holding port 122, and the holding pressure P therefore also prevailing in the holding chamber 123, press the plunger 128 onto the holding stop 129 again under the resulting holding force FH. Consequently, the pressure port 124 of the cleaning valve 120 is blocked again.

Figure 2D:
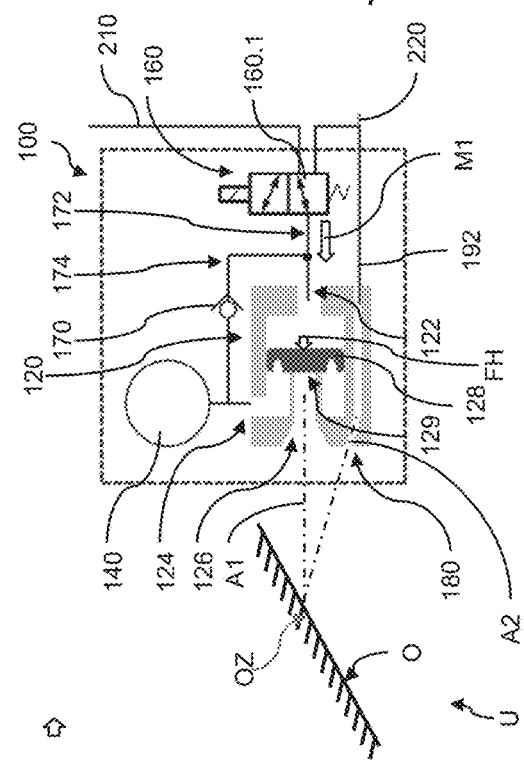

FIG. 2D finally shows the state in which the high-pressure accumulator 140 is refilled. Due to blocking of the pressure port 124, the first medium M1 does not flow only via the holding line 172 to the holding port 122, but also via the accumulator branch point 173 and the accumulator line 174 to the high-pressure accumulator 140, which is thereby filled. After filling of the high-pressure accumulator 140, the cleaning device 120 is ready for further bombardment of the surface O with the first medium M1.

The steps shown in FIGS. 2A to 2D need not necessarily follow each other. It is for example possible to carry out the step shown in FIG. 2A in parallel with the step shown in FIG. 2D. The bombardment of the surface O with the second medium M2 may therefore take place in parallel to a charging of the high-pressure accumulator 140. Also, a bombardment of the surface O with a second medium M2 may take place in parallel with a bombardment of the surface O with a first medium M1.

Figure 3:
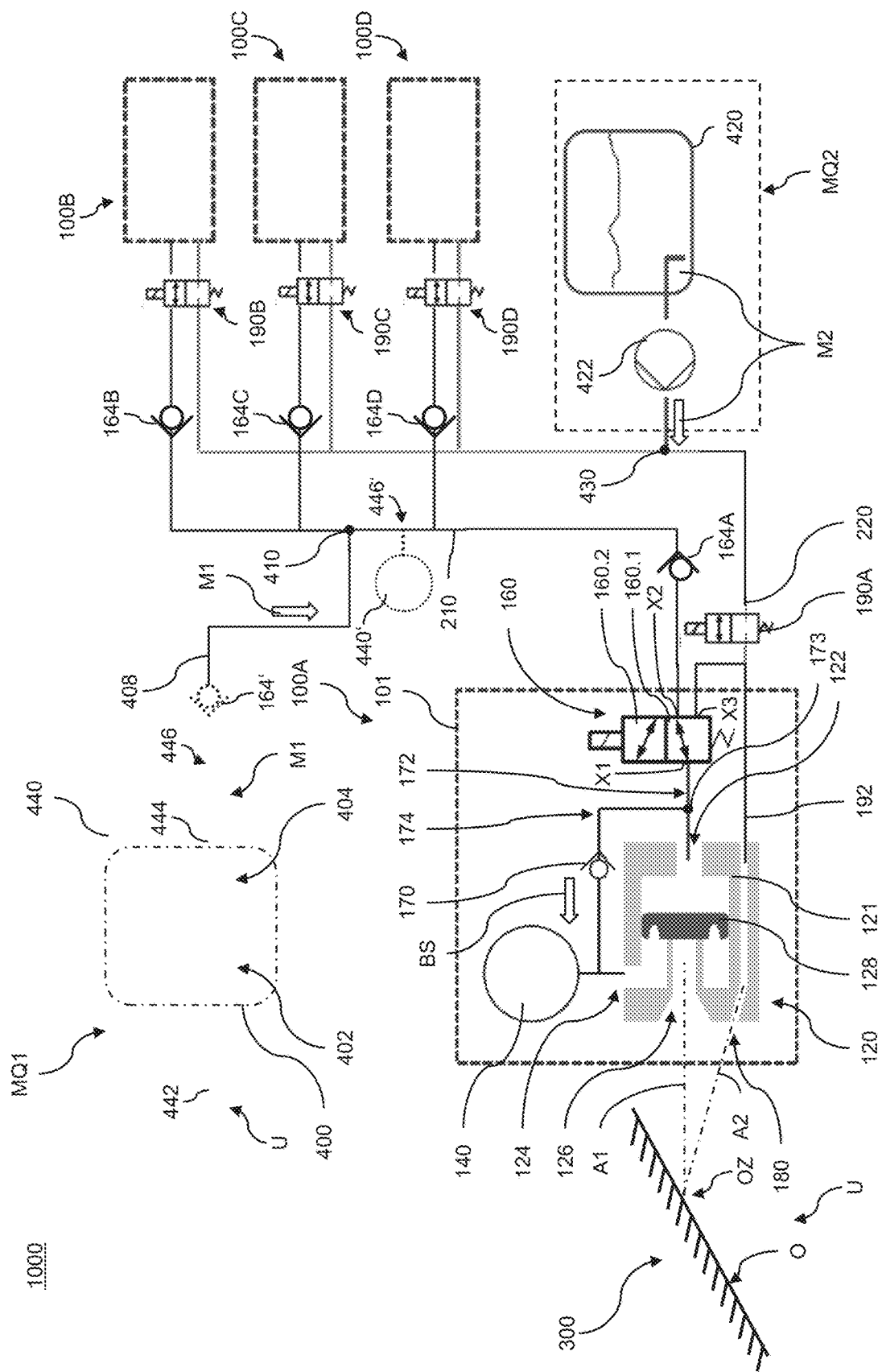
FIG. 3 shows a refinement of a compressed air system according to the concept of the invention.

FIG. 3 shows a refinement of a compressed air system 1000 according to the concept of the invention. The compressed air system 1000 has four cleaning devices 100A, 100B, 100C and 100D which each correspond substantially to the cleaning device 100 shown in FIG. 1. Here only one cleaning device 100A is shown in detail, and the remaining three cleaning devices 100B, 100C and 100D are merely indicated for the sake of clarity.

The compressed air system 1000 has a first medium source MQ1 for providing a first medium M1. The first medium source MQ1 in the present case is formed by a compressor arrangement 400, wherein the compressor arrangement 400 has a compressor 402, an air dryer 404 and a compressed air accumulator 440. Provision of a compressed air accumulator 440 advantageously allows faster supply of the compressed air system 1000, and the generation of compressed air is temporally decoupled from the consumption of compressed air. In the present case, in a refinement, the compressor arrangement 400 is arranged inside the compressed air accumulator 440, which in particular leads to an advantageously compact structure. The first medium M1, in particular air M1.1, is drawn in from the environment U by the compressor 402 via a compressor supply line 442 and compressed, then dried in the air dryer 404 and conducted via a compressor outlet 444 into the compressed air accumulator 440. From the compressed air accumulator 440, the first medium M1 is supplied via an accumulator outlet 446 and on via a first source line 408 to a first supply port 410.

By means of the compressor arrangement 400 in conjunction with the compressed air accumulator 440 as a first medium source MQ1, in particular as an arrangement with the compressor arrangement 400 inside the compressed air accumulator 440, the cleaning devices 100A, 100B, 100C and 100D can be loaded with compressed air relatively quickly, and also a constant pressure can be ensured in the pressure lines connected to the first medium source MQ1, in particular without the compressor arrangement 400 needing to be active.

From the first supply port 410, the first medium M1 reaches a first supply line 210, from which it is provided at the second changeover valve port X2 of the cleaning device 100A, and similarly at the other three cleaning devices 100B-D. In the present case, a supply line check valve 164A is arranged upstream of the second changeover valve port X2 of the cleaning device 100A in the flow direction. Furthermore, a supply line check valve 164B-D is arranged upstream of each of the second changeover valve ports (not shown here) of the other three cleaning devices 100B-D, namely in the branches of the first medium supply line 210 leading to the respective cleaning devices 100B-D. The supply line check valves 164A-D before the respective cleaning devices 100A-D may advantageously prevent a fall in the holding pressure PH and hence the holding force FH. A fall in the holding pressure PH could occur in particular because of leaks in the source and medium supply lines, in particular in the first source line 408 and/or the first medium supply line 210, or if the air pressure cannot be held constant by the first medium source MQ1.

Alternatively or additionally to the supply line check valves 164A-D, the compressed air system 1000 may comprise a further supply line check valve 164', in particular—as indicated in dotted lines in FIG. 3—in the first source line 408. This advantageously achieves that the first medium generated and in particular compressed by the first medium source MQ1 does not, on a pressure fall, flow back into the first medium source MQ1, in particular the compressed air accumulator 440, which would lead to a pressure fall in the first medium supply line 210. Instead, the further supply line check valve 164', which blocks against the conveying direction of the first medium source, causes the first medium not to flow back in the direction of the first medium source MQ1, and hence in particular a holding pressure PH is maintained in the first medium supply line 210.

Alternatively or additionally to the compressed air accumulator 440, the compressed air system 1000 may comprise a further compressed air accumulator 440', in particular—as shown in dotted lines in FIG. 3—in the first medium supply line 210. Said further accumulator in the present case is connected to the medium supply line 210 via an accumulator outlet 446'. It is also possible to arrange the accumulator outlet 446' at another suitable site on the compressed air system 1000, in particular in the first source line 408.

Alternatively or additionally, in a refinement not shown here, a first medium M1, in particular compressed air, may be used which is taken from another medium source MQ1', in particular a medium source MQ1' which serves another primary purpose. Such another medium source MQ1' may for example be a compressed air supply system 900 for an air suspension system 901 or similar pneumatic system 910 of a vehicle 800.

The compressor system 1000 furthermore has a second medium source MQ2 for providing an in particular liquid second medium M2. In the present case, the second medium source MQ2 is formed by a tank 420 and a pump 422 connected to the tank. By means of the pump, the second medium M2 may be conveyed from the tank 420 to a second supply port 430. Via the second supply port 430, the second medium M2 reaches the second medium supply line 220. The second medium supply line 220 is connected to the second changeover valve 190A of the cleaning device 100A, and also to the second changeover valves 190B-D of the respective further cleaning devices 100B-D. Via the second changeover valves 190A-D, the supply of the second medium M2 to the respective cleaning devices 100A-D can be controlled individually.

Alternatively or additionally, in a refinement not shown here, a second medium M2 may also be used which is taken from another medium source MQ2', in particular a medium source MQ2' which serves another primary purpose. Such another medium source MQ2' may for example be a screen washing system 922 or similar cleaning system 920 for a vehicle 800.

Figure 4:
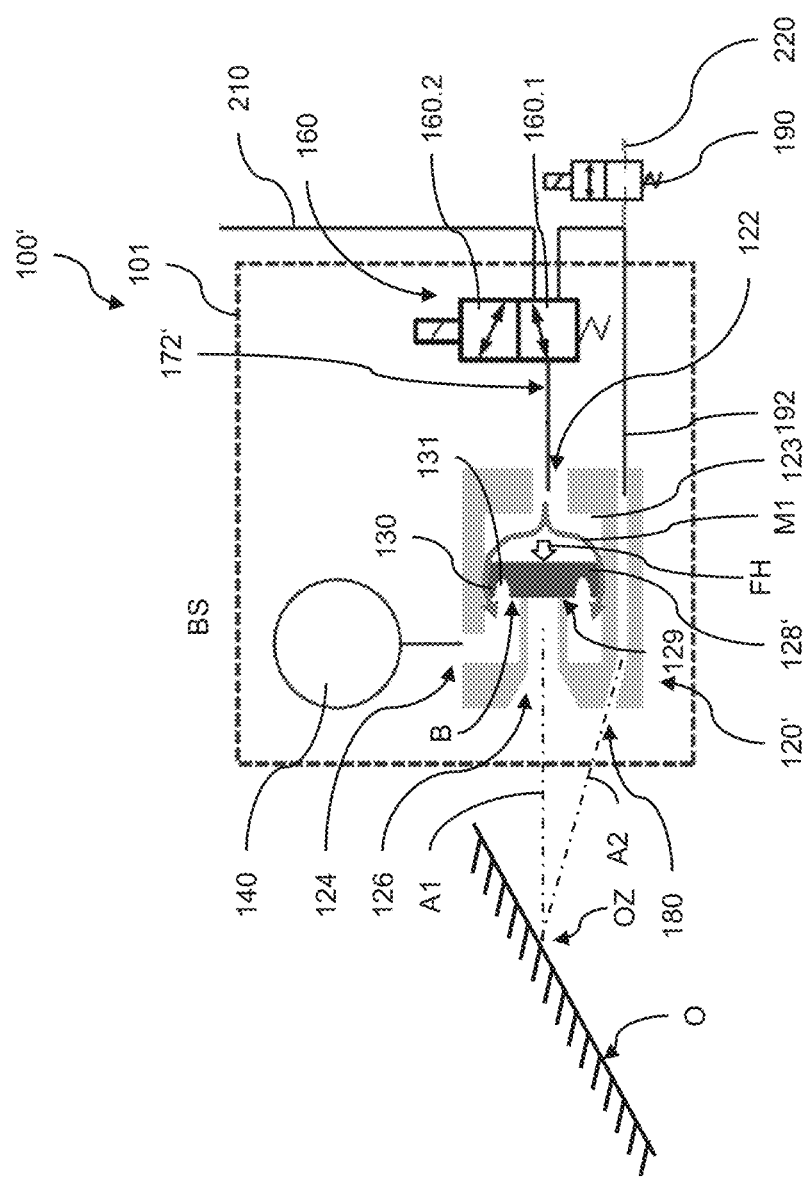
FIG. 4 shows a further preferred refinement of a cleaning device according to the concept of the invention.

FIG. 4 shows a further preferred refinement of a cleaning device 100' according to the concept of the invention. The refinement shown here differs from the refinements described above in particular in that the cleaning device 100' does not have an accumulator branch point 173 or an accumulator line 174. Thus a holding line 172 leads exclusively from the first changeover valve port X1 to the holding port 122 of a cleaning valve 120'. A special plunger 128' is configured such that, on loading of the holding port 122, it is initially pressed against the holding stop 129 by a holding force FH, as in the other refinements shown. The plunger 128' in the present case has an annular recess 131 on the side B facing the inlet chamber 127, and hence a sealing lip 130 running substantially along the outer periphery of the plunger 128'. Such a configuration of the plunger 128' causes the first medium M1, which is under the holding pressure PH present in the holding chamber 123, to move the sealing lip 130 radially inward so that the first medium M1 can flow past the plunger 128' into the inlet chamber 127 of the cleaning valve 120'. In this way, the first medium M1 passes via the pressure port 124 and the accumulator port 142 to the high-pressure accumulator 140. When the high-pressure accumulator 140 is fully charged, in particular when the holding pressure PH prevails in the high-pressure accumulator 140, the sealing lip 130 closes again and the holding pressure PH now prevailing in the inlet chamber 127 leads to an opening force acting on the plunger 128' and in particular on the annular recess 131, which moves the sealing lip 130 radially outward again and hence blocks the flow of the first medium M1 from the holding chamber 123 into the inlet chamber 120. When the control valve 160 is switched from the holding position 160.1 into the release position 160.2, and hence the holding force FH suddenly falls, the plunger 128 moves back into the holding chamber 123. The first medium M1, flowing out of the high-pressure accumulator 140 via the pressure port 124 into the inlet chamber 127, causes an opening force FO on the side facing the inlet chamber 127 and hence also on the annular recess 131. The radial sealing effect of the sealing lip 130 is thus sustained even when the cleaning valve 120' is opened.

Thus in this refinement, the plunger 128' assumes the function of both the accumulator line 174 and the high-pressure accumulator holding valve 170 acting as a check valve, and the structure of the cleaning device is advantageously simplified.

Figure 5:
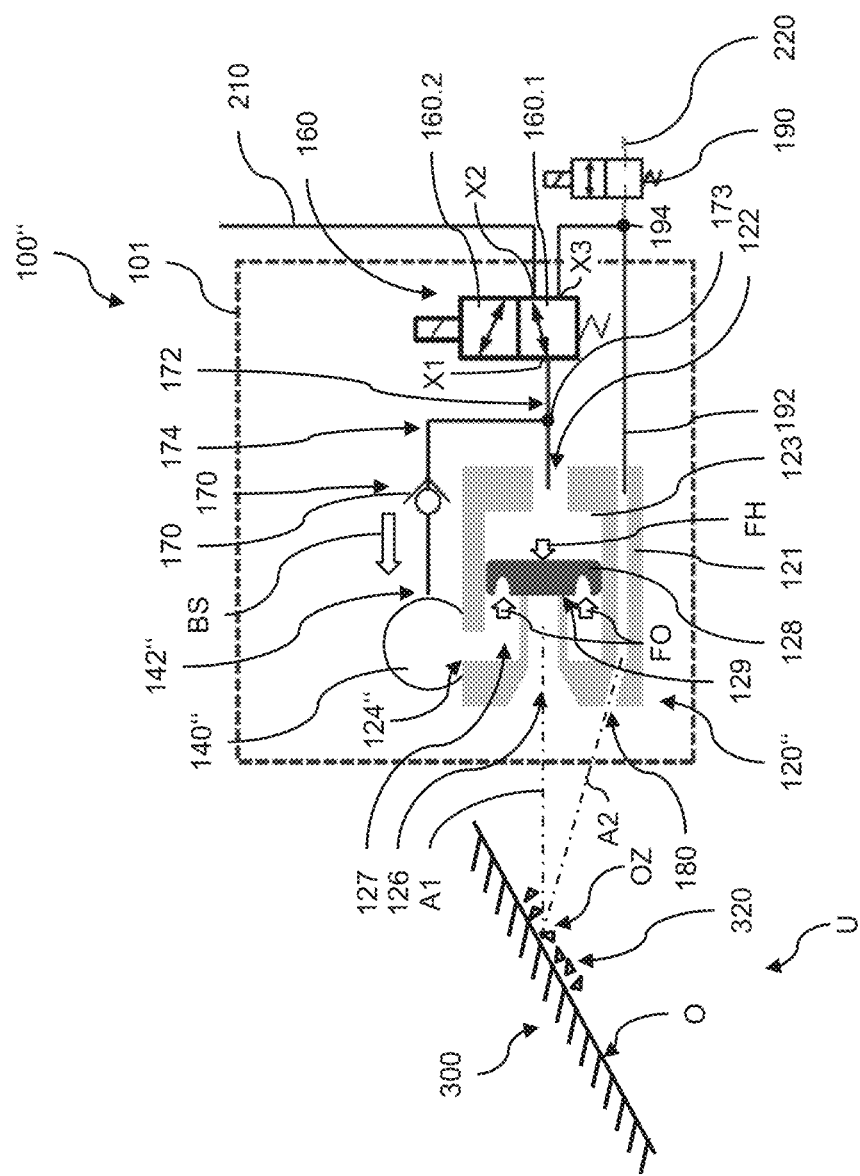
FIG. 5 shows yet a further preferred refinement of a cleaning device according to the concept of the invention.

FIG. 5 shows a further preferred refinement of the cleaning device 100" according to the concept of the invention, with a cleaning valve 120". In this refinement, a high-pressure accumulator 140" and the cleaning valve 120" form a structural unit; in particular, the high-pressure accumulator 140" is arranged directly on the cleaning valve 120". In particular, the high-pressure accumulator 140" may be molded integrally onto the cleaning valve 120" or the housing of the cleaning valve 120", or be connected separably to the cleaning valve 120" or the housing of the cleaning valve 120", for example via a screw and/or flange connection. In such a refinement, in particular when the high-pressure accumulator 140" is integrated in the cleaning valve 120" or forms a structural unit therewith, advantageously a compact construction is achieved. Furthermore, due to the proximity of the high-pressure accumulator 140" to the cleaning valve 120", the medium has shorter distances to travel and therefore pressure losses are advantageously reduced. Also, the impetus of the medium conducted onto the surface 300 from the high-pressure accumulator 140" through the cleaning valve 120" is thereby advantageously increased.

Advantageously, it is also possible to combine the refinement shown in FIG. 4 with the refinement shown in FIG. 5, in order to combine synergetically the feature of a one-way permeable plunger 128' with the feature of a high-pressure accumulator 140" connected directly to the cleaning valve 120", in particular because in this way the distances to be covered by the first medium can be further reduced.

FIG. 6A shows an accumulator valve arrangement 260K in the form of an integrated accumulator valve module 261 of a cleaning device 100K, only a detail of which is illustrated here. The accumulator valve module 261 combines in particular the function of a cleaning valve 120K and of a high-pressure accumulator 140K in an integrated manner, that is to say integrated in one module. The accumulator valve module 261 has in particular a module outer part 266 and a module inner part 268, wherein the module inner part 268 can be inserted along a first jet axis A1 into the module outer part 266 and fastened, in particular by means of a module thread 280 by way of a screwing-in action. The module thread 280 may for example be an M30 thread. To limit the screwing-in movement, the module inner part 268 may in particular have a flange section 282 which, in the screwed-in state of the module inner part 268, abuts against the module outer part 266. Within the module outer part 266, a radial space 284 forms in the radial intermediate space between the module inner part 268 and the module outer part 266, which radial space performs the task of a high-pressure accumulator 140K according to the concept of the invention. The module outer part 266 has, on a module front side 290, that is to say that side of the valve accumulator module 261 which is situated opposite the flange section 282 in an axial direction, an exchange port 262 for the exchangeable connection of a module nozzle tip 264.

Furthermore, in the present case, a nozzle 180K is illustrated which is designed to conduct a second medium M2 (not illustrated here) along a second jet axis A2 onto a surface 300 to be cleaned (likewise not illustrated here). In the refinement illustrated here, the nozzle 180K is illustrated structurally separately from the valve accumulator module 260. It is nevertheless evidently also conceivable for the nozzle 180K to be structurally integrated into the valve accumulator module 261, in particular into the module outer part 266.

The module inner part 268 furthermore has a pot section 288, which forms a practically hollow cylindrical space which is however open to the side averted from the flange section 282, in which space a module plunger 272, which is movable in translation axially in the direction of the first jet axis A1, can be received. Said space corresponds to a holding chamber 123K according to the refinement shown in FIG. 1. Here, the module plunger 272 performs the function of a plunger 128K according to the refinement shown in FIG. 1. This means that the module plunger 272 can be moved selectively between a holding position 272H and a release position 272L in particular in a manner dependent on a holding pressure PHK, which prevails at the module port 286, and an accumulator pressure PSK, which prevails in the high-pressure accumulator 140K. Analogously to the functioning described in FIG. 1, the holding pressure PHK prevailing at the module port 286 results in a holding force FHK, which acts on the module plunger 272, specifically in an axial direction from the flange section 282 to the module front side 290. At the same time, an opening force FOK acts in the opposite direction, that is to say from the module front side 290 in the direction of the flange section 282, on the module plunger 272, wherein the opening force FOK results from an accumulator pressure PSK prevailing in the high-pressure accumulator 140K. FIG. 6A illustrates the valve accumulator module 261 during the filling of the high-pressure accumulator 140K. Here, the holding pressure PHK is in particular selected to be so great that the holding force FHK is greater than the opening force FOK, and thus the module plunger 272 is, within the pot section 288, pushed in the direction of the module front side 290 against a passage connector 292 of the module outer part 266. The module plunger 272 is thus situated in a holding position 272H. By virtue of the fact that the module plunger 272 has a movable, in particular elastic, plunger lip 274, the first medium M1 flowing in via the module port 286 can flow through at least one point of the annular contact between the module plunger 272 and the pot section 288 and thus pass into the high-pressure accumulator 140 K. At the same time, the nature and arrangement of the plunger lip 274 results in a blocking action in the opposite direction, that is to say that the first medium M1 cannot flow from the high-pressure accumulator 140K back into the pot section 288 if the module plunger 272 is situated in the holding position 272H. The ring-shaped space between the passage connector 292 and the pot section 288 thus, in a broader sense, performs the function of a pressure port 124K according to the refinement shown in FIG. 1. The high-pressure accumulator 140K is furthermore sealed off by a module accumulator seal 270 which prevents air from being able to escape through the intermediate space between the module inner part 268 and the module outer part 266, in particular by the module thread 280. In particular, the first medium M1 flows into the high-pressure accumulator 140K until such time as force equilibrium has been established between the opening force FOK and the holding force FHK. Furthermore, the opening force FOK presses the plunger lip 274 sealingly against the pot section 288, such that the first medium M1 cannot escape from the high-pressure accumulator 140K.

FIG. 6B illustrates the valve accumulator arrangement 260K, designed as a valve accumulator module 261, in the released state, that is to say the module plunger 272 is situated in a release position 272L. This is achieved in particular by virtue of the holding pressure PHK which prevails at the module port 286 being lowered, in particular by way of a purge by means of a switching valve which is not illustrated here, such that the holding force FHK correspondingly decreases, and in particular the axial force equilibrium about the module plunger 272 is eliminated. In this case, the module plunger 272 is pushed into the pot section 288 by the accumulator pressure PSK prevailing in the high-pressure accumulator 140K and the resulting opening force FOK, whereby the module plunger 272 is moved away from the passage connector 292, and a pressure outlet 126K is opened up through which the highly pressurized first medium M1 escapes, in particular in the manner of a pulse. In particular, a module nozzle tip 264 can be connected by way of an exchange port 262 to the module outer part 266, such that the escaping first medium M1 is conducted along the jet axis A1 onto a surface 300 to be cleaned (not illustrated here). For this purpose, the module nozzle tip 264 has, on the side facing toward the module outer part 266, an insert section 276 which can be inserted into the exchange port 262. To conduct the first medium M1, the module nozzle tip 264 has a tip passage 278, which is in particular of hollow cylindrical form coaxially with respect to the first jet axis A1. The diameter of the tip passage 278 may for example be 4 mm or 3 mm or 2 mm. In the present case, the module nozzle tip 264 is of conical shape, though other shapes, for example a cylindrical shape, are also conceivable. The connection between the exchange port 262 and the insert section 276 may be produced by means of a threaded connection, in particular with an M8 thread. The axial length of the insert section 276 may for example be 7 mm. The axial overall length of the module nozzle tip 264 including the insert section 276 may be 19 mm or 26 mm.

In the refinement shown, the module port 286 performs both the function of a holding port 122K and the function of an accumulator feed line 174K. That is to say, the module port 286 can be charged with the first medium M1, in particular compressed air, in order firstly to exert a holding force FHK on the module plunger 272 and secondly to fill the high-pressure accumulator 140K with the first medium M1.

After the high-pressure accumulator 140K has been emptied, that is to say after the first medium M1 has escaped from the high-pressure accumulator 140K via the pressure outlet 126K, the high-pressure accumulator 140K can be filled again by virtue of a holding pressure PHK being applied to the module port 286 again. The module plunger 272 consequently moves into the holding position 272H again, and the first medium M1, in particular compressed air, can flow past the plunger lip 272 into the high-pressure accumulator 140K, as already described above.

In the present case, the module nozzle tip 264 is illustrated in the non-mounted state. During the operation of the valve accumulator module 261, said module nozzle tip is correspondingly connected, in particular by screw connection, to the module outer part 266. The releasable connection advantageously allows the module nozzle tip to be exchanged, and/or allows improved access to the pressure outlet 126K for the purposes of maintenance or cleaning. The module inner part 268 furthermore has four fastening holes 294, of which two are visible in the sectional illustration. These may each have a thread, in particular an M3 thread, such that the valve accumulator module 261 can be fastened by means of corresponding M3 screws to a structure, in particular to a vehicle which is not illustrated here.

FIG. 6C shows, for the accumulator valve arrangement 260K as valve accumulator module 261 in a further slightly modified embodiment, a modification relating to the attachment of the module nozzle tip 264. Only the reference designations of relevance here are stated in FIG. 6C; owing to the substantially identical design of the valve accumulator module 261, reference is made, with regard to the details, to the description of the other figures. Alternatively to the above-described attachment directly in contact with and to the module outer part 266, it is also possible—as illustrated here in FIG. 6C—for the module nozzle tip 264 to be connected to the module outer part 266 with a spacing thereto but nevertheless for transport of a medium. For this purpose, in this modification, in the case of the module outer part 266 of the accumulator valve arrangement 260K, a pressure line 277' is attached between pressure outlet 126 and module nozzle tip 264.

Through this pressure line, the highly pressurized first medium M1 escapes, predominantly in the manner of a pulse, along the jet axis A1. Said first medium can, irrespective of the installation position of the cleaning valve 120, be conducted via the module nozzle tip 264 onto a surface 300 to be cleaned (not illustrated here). It is however also possible for the outlet of the pressure line 277' itself to be formed such that it itself functions as a nozzle tip. The outlet of the pressure line 277' can thus itself replicate the function of a nozzle tip, wherein the outlet of the pressure line 277' may also be of any desired simplified shape (for example may simply be truncated), as long as a highly pressurized first medium M1 can escape, predominantly in the manner of a pulse. This has the advantage that a separate nozzle tip 264 according to the embodiments discussed above could substantially be omitted, and thus parts and costs are saved; the outlet of the pressure line 277' may possibly be formed with a tip passage 278, or a functioning nozzle tip may be formed integrally at said outlet (as shown here), or the outlet itself may serve as a functioning tip passage 278, in order to form a tip passage 278 in all cases.

The pressure line 277' may thus be connected to the module outer part 266, in order to charge this with medium, and a supply may in turn be provided to the module outer part 266 via a pressure line 287'. A connection between pressure line 277', 287' (for example a hose) and the module outer part 266 (housing) may for example be effected by way of a flange or a plug-type connection including clamp or the like. The length D of the pressure line 277', 287' may amount to up to several meters depending on the distance to be covered in the vehicle, as illustrated for example in FIG. 8. A number of module outer parts 266 of multiple valve accumulator modules 261 may for example be of compact form in one block, to which the pressure lines 277', 287' are then connected.

FIGS. 7A to 7E show as an example, and greatly simplified, five possible media sequences MS1 to MS5. In the present case, the switching of the media flows, i.e. the respective bombardments with the first medium M1 and the second medium M2, is depicted in simplified form as binary with the values of zero and one. Evidently, it is also possible to control or regulate the respective media flows M1 and M2 continuously, in particular by continuous actuation of the first changeover valve 160 and the second changeover valve 190.

FIG. 7A shows a first media sequence MS1. Here initially, in particular by opening of the second changeover valve 190, the second medium M2 is conducted onto the surface O. After the supply of the second medium M2 has ended after the second bombardment period TM2, after a waiting time TW, the bombardment of the surface O with the first medium M1 begins. This bombardment extends over a first bombardment period TM1. The first bombardment period TM1 is here in particular determined by the capacity of the high-pressure accumulator 140 and the flow speed of the first medium M1 through the cleaning valve 120.

FIG. 7B shows a second media sequence MS2. In the second media sequence MS2, a substantially temporally parallel bombardment of the surface O with the first medium M1 and the second medium M2 takes place. Here, the bombardment of the surface O with the first medium M1 takes place intermittently in several pulses, namely four successive pulses each of duration TM1. The individual pulses are interrupted by a waiting time TW'. During this time, the surface O is bombarded with the second medium M2 over a period TM2'. Evidently here too, the length and number of the bombardments, in particular of the pulses of the first medium M1, may be adapted depending on requirements and environmental conditions.

FIG. 7C shows a third media sequence MS3. Here, the order of bombardment is substantially reversed relative to that of the media sequence MS1 shown in FIG. 7A. This means in particular that firstly, bombardment with the first medium M1 takes place over a first duration TM1''', and after said bombardment and a subsequent waiting time TW''', bombardment with the second medium M2 takes place over a second duration TM2'''. With such a media sequence MS3, initially with a pulse-like bombardment with a first in particular gaseous medium M1, in particular dirt and particles may be detached from the surface which is then cleaned by bombardment with a second, in particular liquid medium M2.

FIG. 7D shows a fourth media sequence MS4. In this media sequence MS4, bombardment of the surface O takes place exclusively with the first medium M1. In particular, this may mean that the surface O is bombarded with a gaseous medium in pulse-like fashion, in particular with air pressure pulses. This may be possible or useful for example if the surface O is already wet, for example while it is raining. In the present case, as an example, a sequence of three bombardments is shown, each with a first duration TM1'''' and separated by a respective waiting time TW''''.

FIG. 7E shows a fifth media sequence MS5. In this media sequence MS5, bombardment of the surface O takes place exclusively with a second medium M2. In particular, this may mean that the surface O is bombarded solely with the liquid medium, in particular water or a cleaning fluid. In the present case, as an example, a sequence of three bombardments is shown, each with a second duration TM2''''' and separated by a respective waiting time TW'''''.

Evidently, the sequences shown in FIGS. 7A to 7E may be repeated or combined with each other arbitrarily and in particular as required. For this, in particular a control module 350 (not shown here) or similar control device may be used. In particular, an alternating bombardment with a first medium M1 and a second medium M2, in particular an alternating bombardment with compressed air and cleaning fluid, may be advantageous for achieving a desired or necessary cleaning effect.

It is furthermore possible to establish the number of repeats of an individual bombardment or media sequence, for example three or five repeats.

In a refinement, it is also advantageously possible to repeat an individual bombardment or media sequence depending on the cleaning effect achieved and/or the particles 320 remaining on the surface O. Thus for example a measurement value of the sensor 300 assigned to the surface O may serve as an interruption criterion for the repeats. This may for example be a brightness value of an optical sensor, which increases as more particles are removed from the surface, or a reference image which has increased correlation with a camera image recording by the optical sensor 300 as more particles are removed from the surface.

Figure 8:
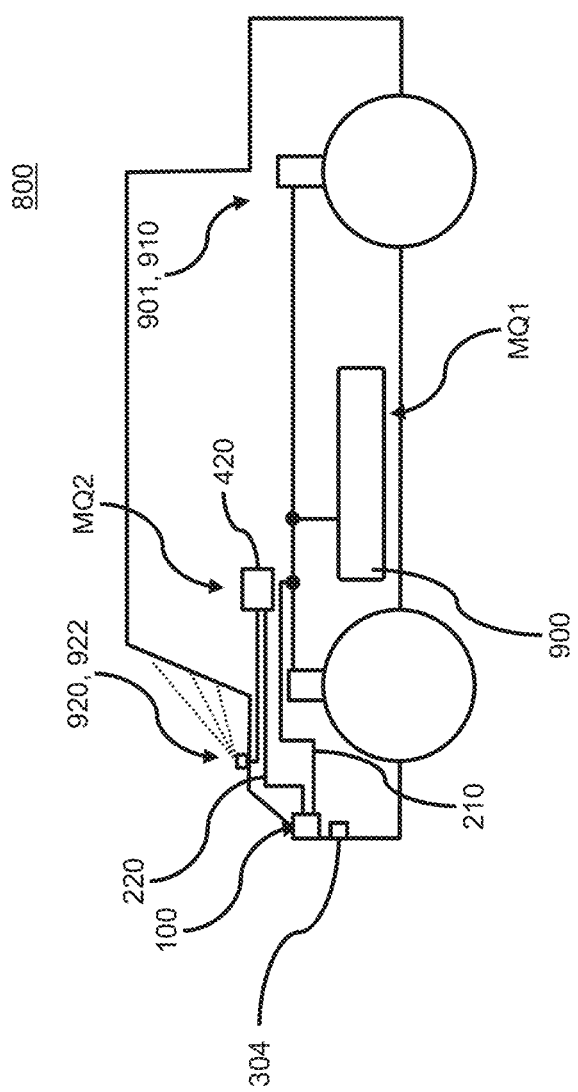
FIG. 8 shows a schematic depiction of a vehicle having a cleaning device according to the concept of the invention.

FIG. 8 shows a diagrammatic depiction of a vehicle 800, in the present case in the form of a car, comprising a cleaning device 100 for an environment detection sensor 304. In the present case, the first medium source MQ1 is formed by a compressed air supply system 900 which is furthermore provided for supplying a pneumatic system 910 in the form of an air suspension system 901. Evidently, it is also possible for the first medium source MQ1 to be formed by a separate compressor or similar compressed air source. The first medium source MQ1 is connected to the cleaning device 100 for the purpose of supplying the first medium M1 via a first medium supply line 210. The second medium source MQ2 in the present case is formed by a tank 420, which is also used to supply cleaning fluid to a cleaning system 920 in the form of a screen cleaning system 922. This tank 420 is connected to the cleaning device 100 via a second medium supply line 220. In this way, the second medium M2 can be supplied to the cleaning device 100 via a pump 422 (not shown here for reasons of clarity). Evidently, the second medium source MQ2 may also be formed by a specific, separate medium source, in particular independent of other systems.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 100, 100A-D, Cleaning device
100K, 100', 100"
101 Cleaning module, structural unit
120, 120', 120", Cleaning valve
120K
121 Fast purge valve
122, 122K Holding port
123 Holding chamber
124, 124", 124K Pressure port
126, 126K Pressure outlet
127 Inlet chamber
128, 128', 128K Plunger
129 Holding stop
130 Sealing lip
131 Annular recess
140, 140", 140K High-pressure accumulator
142, 142" Accumulator port
144 Charging branch point
160 Changeover valve
160.1 Holding position
160.2 Release position
164, 164', 164A-D Supply line check valve
170 High-pressure accumulator holding valve
170' Check valve
172, 172' Holding line
173 Accumulator branch point
174, 174K Accumulator line
180, 180K Nozzle
190 Second changeover valve
192 Supply line
194 Purge branch point
210 First medium supply line
220 Second medium supply line
260, 260K Valve accumulator arrangement
261 Valve accumulator module
262 Exchange port
264 Module nozzle tip
266 Module outer part
268 Module inner part
270 Module accumulator seal
272 Module plunger
272H Holding position of the module plunger
272L Release position of the module plunger
274 Plunger lip
276 Insert section
277' Pressure line
278 Tip passage
280 Module thread
282 Flange section
284 Radial space
286 Module port
287' Pressure line
288 Pot section
290 Module front side
292 Passage connector
294 Fastening holes
300 Sensor
302 Optical sensor
304 Environment detection sensor
310 Sensor cover
320 Dirt particle
350 Control module
352 First changeover valve control line
354 Second changeover valve control line
400 Compressor arrangement
402 Compressor
404 Air dryer
408 First source line
410 First supply port
420 Tank
422 Pump
430 Second supply port
440, 440' Compressed air accumulator
442 Compressor supply
444 Compressor outlet
446, 446' Accumulator outlet
800 Vehicle
900 Compressed air supply system
901 Air suspension system
910 Pneumatic system
920 Cleaning system
922 Screen cleaning system
1000 Compressed air system A1 First jet axis
A2 Second jet axis
B Side of plunger facing the inlet chamber
BS Filling direction
D Length of the pressure line
FH, FHK Holding force
FO, FOK Opening force
M1 First medium
M1.1 Air
M2 Second medium
M2.1 Water
M2.2 Cleaning agent
MS, MS1-5 Media sequence
MQ1, MQ1' First medium source
MG2 Second medium source
O Surface
OZ Target region
PH, PHK Holding pressure
PS, PSK Accumulator pressure
TM1 First bombardment period
TM2, TM2' Second bombardment period
TW, TW' Waiting time
X1 First changeover valve port
X2 Second changeover valve port
X3 Third changeover valve port

The invention claimed is:

1. A cleaning device for selectively bombarding a surface with a media sequence of at least a first gaseous medium and a second liquid medium, the cleaning device comprising:
a nozzle configured to bombard the surface with the second medium,
a cleaning valve with a holding port, a pressure port, a plunger, and a pressure outlet,
a pressure accumulator configured to store the first medium, the first medium being loaded with an accumulator pressure,
a changeover valve configured to selectively create a connection between a first medium supply line and a holding line connected to the holding port, and
a valve accumulator arrangement configured as a valve accumulator module, the valve accumulator module including at least the cleaning valve and the pressure accumulator,
wherein the pressure accumulator is integrated into the valve accumulator module, and
wherein the pressure outlet is configured to bombard the surface with the first medium in pulse-like fashion.

2. The cleaning device as claimed in claim 1, wherein the cleaning device is configured, via a control module, to bombard the surface with the first medium and/or the second medium individually, simultaneously, or alternately.

3. The cleaning device as claimed in claim 1, wherein the cleaning device is configured to control a composition and order of a sequence of media bombarding the surface temporally.

4. The cleaning device as claimed in claim 1, wherein the cleaning valve is a fast purge valve.

5. The cleaning device as claimed in claim 1, wherein the cleaning valve has a movable plunger, wherein the plunger is configured to be controlled via a holding pressure present at the holding port.

6. The cleaning device as claimed in claim 4, wherein the plunger is configured so as to be one-way permeable to allow a flow of the first medium from the holding port to the pressure port and to block the flow in the opposite direction.

7. The cleaning device as claimed in claim 1, wherein the pressure accumulator is connected to the holding line via an accumulator branch point and an accumulator line.

8. The cleaning device as claimed in claim 7, wherein a pressure accumulator holding valve is arranged in the accumulator line, wherein the pressure accumulator holding valve is a check valve that blocks against a filling direction of the pressure accumulator.

9. The cleaning device as claimed in claim 1, wherein the pressure outlet is configured to conduct the first medium onto the surface along a first jet axis.

10. The cleaning device as claimed in claim 9, wherein the nozzle is configured to conduct the second medium onto the surface along a second jet axis.

11. The cleaning device as claimed in claim 10, wherein the first jet axis and the second jet axis intersect in a target region on the surface.

12. The cleaning device as claimed in claim 1, wherein the pressure accumulator has a capacity of 0 cl to 20 cl.

13. The cleaning device as claimed in claim 1, wherein the cleaning device is arranged as a structural unit in a form of a cleaning module.

14. The cleaning device as claimed in claim 1, wherein the nozzle is supplied via a supply line, wherein the supply line is connected to a second medium supply line via a second changeover valve.

15. The cleaning device as claimed in claim 1, wherein
the valve accumulator module is constructed from a module inner part and a module outer part, and/or
the pressure outlet has an exchange port for the exchangeable connection of a module nozzle tip.

16. A compressed air system comprising:
a sensor, wherein the sensor or a transparent cover of the sensor has a surface,
at least one cleaning device as claimed in claim 1, wherein
a first medium source of the compressed air system is configured to be connected to the at least one cleaning device via the first medium supply line, and
a second medium source can be connected to the at least one cleaning device via a second medium supply line.

17. The compressed air system as claimed in claim 16, wherein the first medium source is configured to supply the first medium to an air suspension system or other pneumatic system.

18. The compressed air system as claimed in claim 16, wherein the second medium source is configured to supply the second medium to a screen cleaning system or similar cleaning system.

19. The compressed air system as claimed in claim 16, wherein the sensor is an optical sensor.

20. The compressed air system as claimed in claim 16, wherein the first medium source has a compressor arrangement and/or a compressed air accumulator.

21. The compressed air system as claimed in claim 16, wherein the compressed air system comprises at least one supply line check valve in the first medium supply line and/or a first source line.

22. A cleaning method for cleaning a surface with a cleaning device by selectively bombarding the surface with a media sequence of at least a first gaseous medium and a second liquid medium, the method comprising:
charging a pressure accumulator with the first medium;
holding an accumulator pressure in the pressure accumulator by holding a holding pressure at a holding port of a cleaning valve by switching a changeover valve into a holding position;
bombarding the surface with the second medium; and/or bombarding the surface with the first medium by releasing the holding pressure at the holding port by switching the changeover valve into a release position.

23. The cleaning method as claimed in claim 22, wherein the bombardment of the surface with the second medium and the bombardment of the surface with the first medium take place alternately and/or intermittently.

\* \* \* \* \*